United States Patent
Bae (10) Patent No.: US 8,352,755 B2
(45) Date of Patent: Jan. 8, 2013

(54) DIGITAL IMAGE SYSTEM TRANSMITTING DIGITAL IMAGE DATA

(75) Inventor: TaeHoon Bae, Suwon (KR)

(73) Assignee: Opticis Co., Ltd., Seongnam, Gyeonggi-Do (KR)

( * ) Notice: Subject to any disclaimer, the term of this patent is extended or adjusted under 35 U.S.C. 154(b) by 722 days.

(21) Appl. No.: 12/522,908

(22) PCT Filed: Jan. 2, 2008

(86) PCT No.: PCT/KR2008/000013
§ 371 (c)(1),
(2), (4) Date: Jul. 10, 2009

(87) PCT Pub. No.: WO2008/084936
PCT Pub. Date: Jul. 17, 2008

(65) Prior Publication Data
US 2010/0045867 A1    Feb. 25, 2010

(30) Foreign Application Priority Data

Jan. 11, 2007  (KR) .................. 10-2007-0003408

(51) Int. Cl.
*G06F 1/00* (2006.01)
(52) U.S. Cl. .............. 713/300; 348/207.1; 348/372; 345/211
(58) Field of Classification Search ............. 713/300; 710/302; 348/207.2, 372, 375, 374, 723, 348/725, 207.1; 345/211
See application file for complete search history.

(56) References Cited

U.S. PATENT DOCUMENTS

| | | | | |
|---|---|---|---|---|
| 6,125,455 A * | 9/2000 | Yeo | ................................... | 714/14 |
| 6,963,968 B2 * | 11/2005 | Kori | ................................. | 713/1 |
| 7,046,294 B1 * | 5/2006 | Sasaki | ........................ | 348/372 |
| 7,154,553 B2 * | 12/2006 | Horii et al. | .................... | 348/372 |
| 7,269,673 B2 * | 9/2007 | Kim et al. | ...................... | 710/72 |
| 7,406,607 B2 * | 7/2008 | Echizenya | ................... | 713/300 |
| 7,424,569 B2 * | 9/2008 | Matsuda | ...................... | 710/316 |
| 7,451,328 B2 * | 11/2008 | Hsieh | ........................... | 713/300 |
| 7,523,241 B2 * | 4/2009 | Konishi | ....................... | 710/302 |
| 7,609,255 B2 * | 10/2009 | Frederick et al. | ............. | 345/211 |
| 7,908,414 B2 * | 3/2011 | Combs et al. | .................. | 710/62 |
| 7,911,530 B2 * | 3/2011 | Sawachi | ....................... | 348/372 |
| 8,051,308 B2 * | 11/2011 | Hsieh | ........................... | 713/300 |
| 8,054,601 B2 * | 11/2011 | Udagawa | ....................... | 361/92 |
| 8,106,630 B2 * | 1/2012 | Tupman et al. | .............. | 320/132 |
| 2003/0011704 A1 * | 1/2003 | Sawachi | ....................... | 348/372 |
| 2003/0107566 A1 * | 6/2003 | Shin et al. | .................... | 345/212 |

(Continued)

FOREIGN PATENT DOCUMENTS

EP    1662787 A2    5/2006

(Continued)

OTHER PUBLICATIONS

Lattice Semiconductor Corporation. Designing an I2C Master Controller. Feb. 2002.*

(Continued)

*Primary Examiner* — Matthew D Spittle
(74) *Attorney, Agent, or Firm* — Nixon Peabody LLP (57) ABSTRACT

A digital image system which transmits digital image data, and more particularly, to a digital image system in a high definition multimedia interface (HDMI) format or a digital visual interface (DVI) format.

10 Claims, 8 Drawing Sheets

U.S. PATENT DOCUMENTS

| | | | |
|---|---|---|---|
| 2003/0110403 A1* | 6/2003 | Crutchfield et al. | 713/300 |
| 2003/0132941 A1 | 7/2003 | Echizenya | |
| 2005/0141851 A1* | 6/2005 | Nakayama et al. | 386/46 |
| 2006/0208929 A1* | 9/2006 | Cho | 341/50 |
| 2009/0150589 A1* | 6/2009 | Watarai et al. | 710/302 |
| 2010/0060784 A1* | 3/2010 | Ansari | 348/441 |
| 2010/0132001 A1* | 5/2010 | Kitano et al. | 725/118 |
| 2010/0135429 A1* | 6/2010 | Nakajima | 375/295 |
| 2010/0259691 A1* | 10/2010 | Sasazaki | 348/723 |
| 2011/0068736 A1* | 3/2011 | Chartier et al. | 320/107 |
| 2011/0084685 A1* | 4/2011 | Zhong et al. | 324/76.11 |
| 2011/0113264 A1* | 5/2011 | Kim | 713/300 |

FOREIGN PATENT DOCUMENTS

| | | |
|---|---|---|
| JP | 2006-072333 | 3/2006 |
| JP | 2006-115516 | 4/2006 |
| JP | 2006155256 A | 6/2006 |
| KR | 1998-023323 | 7/1998 |
| KR | 2000-0002556 | 2/2000 |
| KR | 1020030041632 A | 5/2003 |
| KR | 1020040095397 A | 11/2004 |
| WO | 2008084936 A1 | 7/2008 |

OTHER PUBLICATIONS

ExtroNews. Understanding EDID—Extended Display Identification Data. Fall 2009.*

Texas Instruments. HDMI Companion Chip with Step-Up DC-DC, I2C Level Shifter, and High-Speed ESD Clamps for Portable Applications. Apr. 2012.*

McCrory et al. How to Meet the HDMI 5V Source Requirement. Application Note AN-1998. 2009.*

German Office Action in German Application Serial No. 112008000138.3, dated Oct. 26, 2011.

* cited by examiner

DIGITAL IMAGE SYSTEM TRANSMITTING DIGITAL IMAGE DATA

CROSS-REFERENCE TO RELATED PATENT APPLICATION

This application is a national phase of International Application No. PCT/KR2008/000013, entitled "DIGITAL IMAGE SYSTEM TRANSMITTING DIGITAL IMAGE DATA", which was filed on Jan. 2, 2008, and which claims priority of Korean Patent Application No. 10-2007-0003408, filed on Jan. 11, 2007 in the Korean Intellectual Property Office, the disclosure of which is incorporated herein in its entirety by reference.

BACKGROUND OF THE INVENTION

1. Technical Field

The present invention generally relates to a digital image system which transmits digital image data, and more particularly, to a digital image system in a high definition multimedia interface (HDMI) format or a digital visual interface (DVI) format.

2. Background Art

Figure 1:
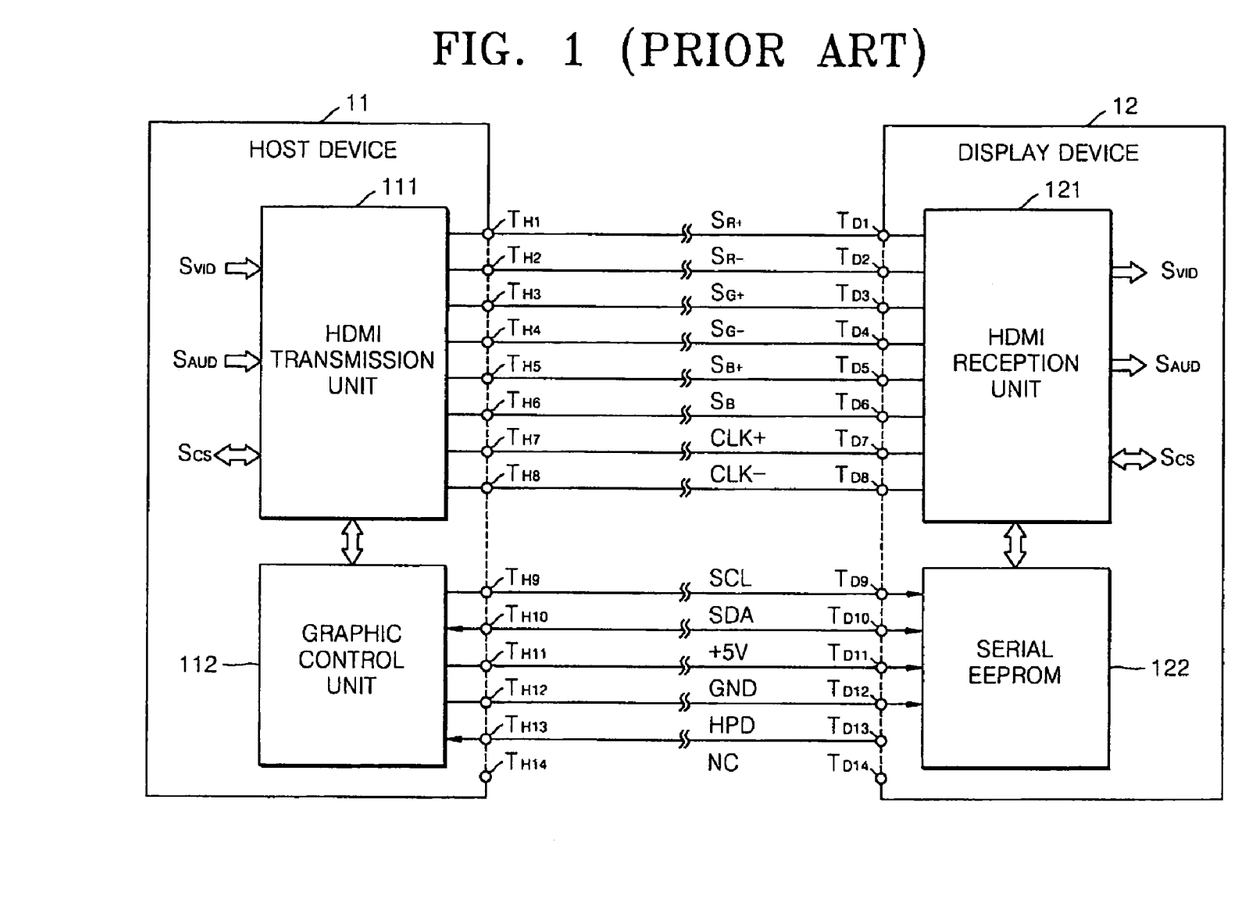
FIG. 1 illustrates a digital image system in a basic high definition multimedia interface (HDMI) format.

Referring to FIG. 1, a digital image system in a basic high definition multimedia interface (HDMI) format includes a host device 11, a display device 12, and electric cables. The electric cables are connected between input/output terminals $T_{H1}$ through $T_{H14}$ of the host device 11 and input/output terminals $T_{D1}$ through $T_{D14}$ of the display device 12.

The host device 11 includes an HDMI transmission unit 111 and a graphic control unit 112. The display device 12 includes a serial electrically erasable and programmable read only memory (EEPROM) 122 and an HDMI reception unit 121.

The HDMI transmission unit 111 in the host device 11 converts audio data $S_{AUD}$, a clock signal $S_{CS}$, and digital image data $S_{VID}$ into transition minimized differential signaling (TMDS) signals in an HDMI format and outputs the TMDS signals to the display device 12.

More specifically, the audio data $S_{AUD}$ and the digital image data $S_{VID}$ are processed by the HDMI transmission unit 111 and are output as red signals $S_{R+}$ and $S_{R-}$ of 2 channels, green signals $S_{G+}$ and $S_{G-}$ of 2 channels, and blue signals $S_{B+}$ and $S_{B-}$ of 2 channels. The clock signal $S_{CS}$ is processed by the HDMI transmission unit 111 and is output as clock signals CLK+ and CLK− of 2 channels.

The serial EEPROM 122 in the display device 12 stores extended display identification data (EDID) of the display device 12 and provides the EDID to the graphic control unit 112 of the host device 11 according to an inter-integrated circuit (I²C) communication protocol.

In I2C communication, the graphic control unit 112 exchanges data signals SDA with the serial EEPROM 122 while transmitting a clock signal SCL to the serial EEPROM 122. The graphic control unit 112 provides a power-supply potential of +5V and a ground potential GND to the serial EEPROM 122 for an operation of the serial EEPROM 122. The display device 12 applies a hot plug detect (HPD) signal voltage HPD to the graphic control unit 112 and thus the graphic control unit 112 recognizes that the graphic control unit 112 is connected with the display device 12. Reserved terminals $T_{H14}$ and $T_{D14}$ that are not used are referred to as no-connection (NC) terminals.

The graphic control unit 112 in the host device 11 controls an operation of the HDMI transmission unit 111 according to the EDID.

The HDMI reception unit 121 in the display device 12 restores the audio data $S_{AUD}$, the clock signal $S_{CS}$, and the digital image data $S_{VID}$ from the TMDS signals in the HDMI format, which have been received from the host device 11.

Figure 2:
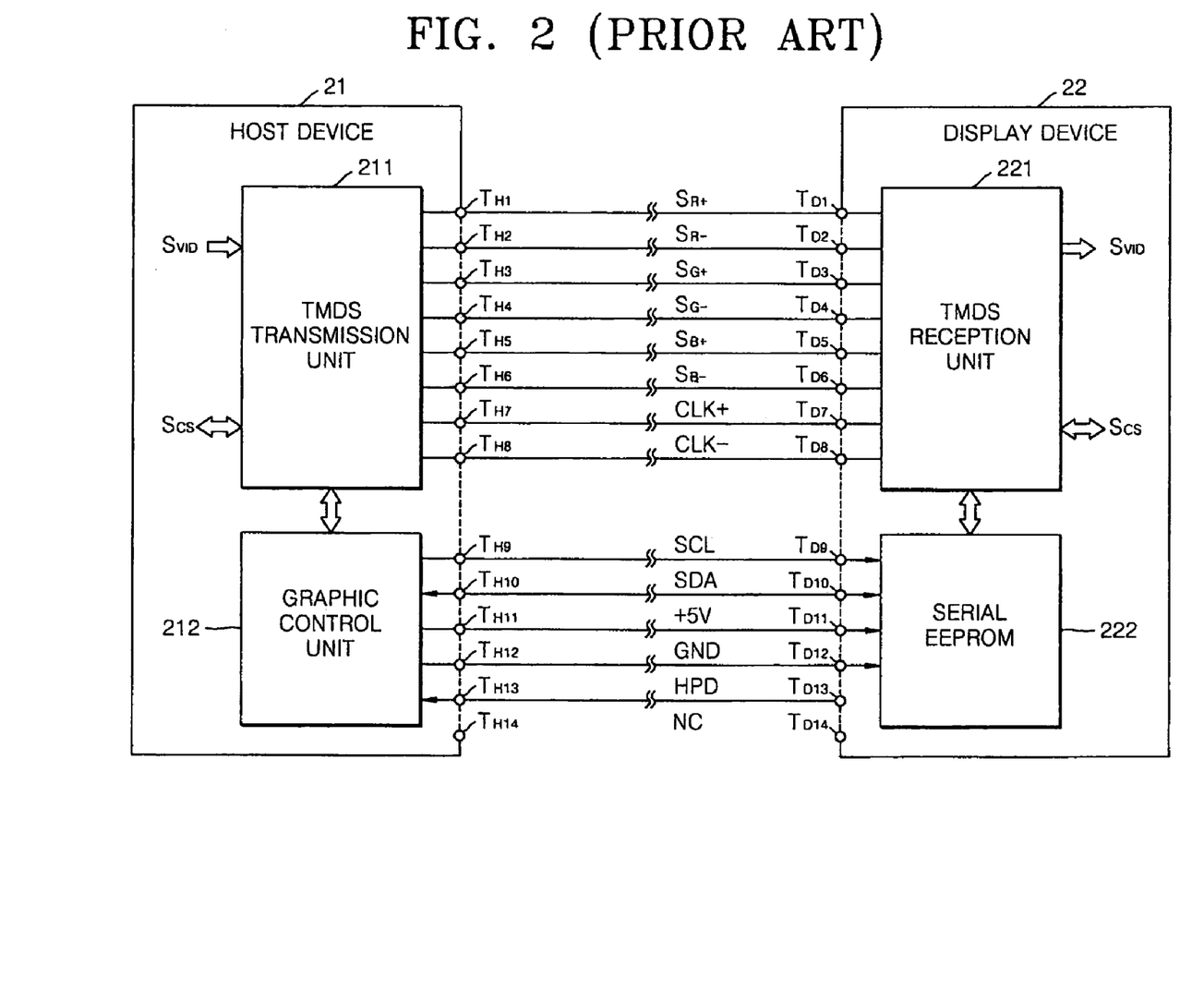
FIG. 2 illustrates a digital image system in a basic digital visual interface (DVI) format.

FIG. 2 illustrates a digital image system in a general digital visual interface (DVI) format. In FIGS. 1 and 2, like reference numerals refer to like elements. Hereinafter, only differences between the digital image system illustrated in FIG. 2 and the digital image system illustrated in FIG. 1 will be described. Referring to FIG. 1, the digital image system in a basic DVI format includes a host device 21, a display device 22, and electric cables. The electric cables are connected between input/output terminals $T_{H1}$ through $T_{H14}$ of the host device 21 and input/output terminals $T_{D1}$ through $T_{D14}$ of the display device 22.

The host device 21 includes a TMDS transmission unit 211 and a graphic control unit 212. The display device 22 includes a serial EEPROM 222 and a TMDS reception unit 221.

The TMDS transmission unit 211 in the host device 11 converts a clock signal $S_{CS}$ and digital image data $S_{VID}$ into TMDS signals in a DVI format and outputs the TMDS signals to the display device 22.

The serial EEPROM 222 in the display device 22 stores EDID of the display device 22 and provides the EDID to the graphic control unit 212 of the host device 21 according to the I²C communication protocol.

The graphic control unit 212 of the host device 21 controls an operation of the TMDS transmission unit 211 according to the EDID.

The TMDS reception unit 221 in the display device 22 restores the clock signal $S_{CS}$ and the digital image data $S_{VID}$ from the TMDS signals in the DVI format, which have been received from the host device 21.

In the digital image system illustrated in FIG. 1 or 2, the maximum length between the host device 11 or 21 and the display device 12 or 22 is limited to about 10 m. When a distance between the host device 11 or 21 and the display device 12 or 22 is long, a transmission/reception reinforcement device such as an optical cable module, a repeater, or an equalizer is required.

In a digital image system where the host device 11 or 21 transmits digital image data to the display device 12 or 22 using the transmission/reception reinforcement device, transmission of the digital image data is not smooth if an external power supply of the transmission/reception reinforcement device drops and the transmission may not be performed at all if the external power supply is interrupted.

DETAILED DESCRIPTION OF THE INVENTION

Technical Problem

The present invention provides a digital image system in which a host device transmits digital image data to a display device using a transmission/reception reinforcement device, whereby smooth transmission of the digital image data can be maintained even when an external power supply of the transmission/reception reinforcement device drops or is interrupted.

Technical Solution

According to an aspect of the present invention, there is provided a digital image system including a host device, a transmission/reception reinforcement device, and a display device.

The host device transmits digital image data to the display device through the transmission/reception reinforcement device.

The transmission/reception reinforcement device includes a first power-supply switching unit and/or a second power-supply switching unit.

Each of the first power-supply switching unit and the second power-supply switching unit includes an external power-supply input terminal, an internal power-supply input terminal, a power-supply output terminal, and a switch.

A separate external power-supply voltage is input to the external power-supply input terminal.

The internal power-supply input terminal is connected with one internal power-supply line out of communication lines between the host device and the display device.

The external power-supply voltage from the external power-supply input terminal or an internal power-supply voltage from the internal power-supply input terminal is output from the power-supply output terminal.

The switch enters an ON state when the external power-supply voltage from the external power-supply input terminal becomes lower than a predetermined voltage.

The external power-supply voltage is applied to the power-supply output terminal when the switch is in an OFF state and the internal power-supply voltage from the internal power-supply input terminal is applied to the power-supply output terminal when the switch is in the ON state.

Advantageous Effects

According to the digital image system according to the present invention, when the external power-supply voltage is applied, the transmission/reception reinforcement device operates by means of the external power-supply voltage. When the external power-supply voltage becomes lower than a predetermined voltage or is not applied, the transmission/reception reinforcement device operates by means of an internal power-supply voltage applied through one internal power-supply line outside of communication lines between the host device and the display device.

Therefore, smooth transmission of digital image data can be maintained in spite of dropping or interruption of an external power-supply of the transmission/reception reinforcement device.

BEST MODE

Figure 3:
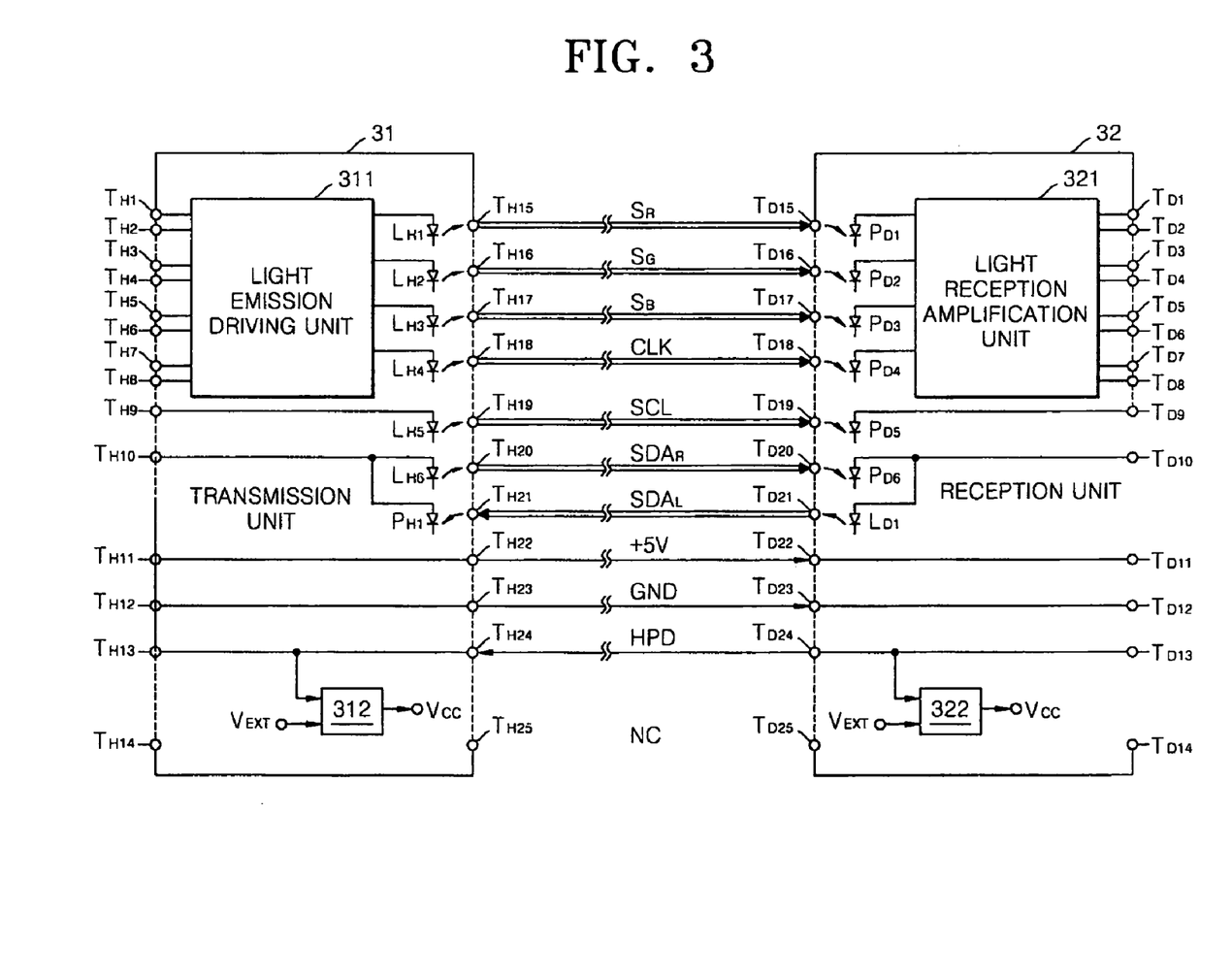
FIG. 3 illustrates an optical cable module as a transmission/reception reinforcement device interposed between a host device illustrated in FIG. 1 or 2 and a display device illustrated in FIG. 1 or 2 according to a first embodiment of the present invention.

FIG. 3 illustrates an optical cable module as a transmission/reception reinforcement device interposed between a host device 11 or 21 illustrated in FIG. 1 or 2 and a display device 21 or 22 illustrated in FIG. 1 or 2 according to a first embodiment of the present invention. In FIGS. 1 through 3, like reference numerals refer to like elements. A digital image system illustrated in FIG. 1 or 2 is also used in the first embodiment of the present invention and thus will not be described in detail.

Referring to FIGS. 1 through 3, a transmission/reception reinforcement device included in the digital image system according to the first embodiment of the present invention is an optical cable module including optical cables $T_{H15}$-$T_{D15}$ through $T_{H21}$-$T_{D21}$, a transmission unit 31, and a reception unit 32. In FIG. 3, reference numerals $L_{H1}$ through $L_{H6}$ and $L_{D1}$ indicate light emitting diodes and $P_{D1}$ through $P_{D6}$ and $P_{H1}$ indicate light receiving diodes.

The transmission unit 31 operates when supplied with a power-supply voltage $V_{CC}$ from a first power-supply switching unit 312, converts digital image data $S_{R+}$ through CLK−, an I²C communication clock signal SCL, and I²C communication data SDA, which have been received from the host device 11 or 21, into optical signals $S_R$ through $SDA_R$ by means of a light emission driving unit 311 for output to the optical cables $T_{H15}$-$T_{D15}$ through $T_{H20}$-$T_{D20}$, and converts I²C communication data $SDA_L$ received from the optical cable $T_{H21}$-$T_{D21}$ into an electric signal for output to the host device 11 or 21.

The reception unit 32 operates when supplied with the power-supply voltage $V_{CC}$ from a second power-supply switching unit 322, converts the optical signals $S_R$ through $SDA_R$ received from the optical cables $T_{H15}$-$T_{D15}$ through $T_{H20}$-$T_{D20}$ into the digital image data $S_{R+}$ through CLK−, the I²C communication clock signal SCL, and the I²C communication data SDA by means of a light reception amplification unit 321 for output to the display device 12 or 22, and converts the I²C communication data SDA received from the display device 12 or 22 into the I²C communication data $SDA_L$ for output to the optical cable $T_{H21}$-$T_{D21}$.

Figure 4:
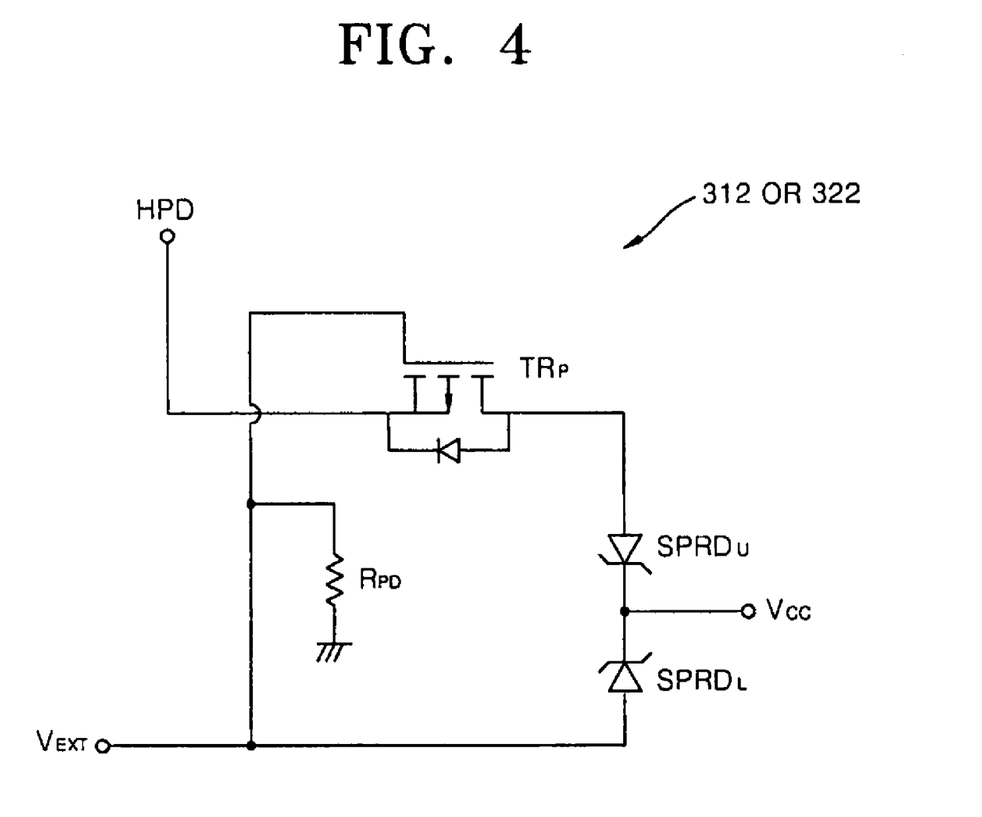
FIG. 4 illustrates an internal circuit of a first power-supply switching unit or a second power-supply switching unit included in the transmission/reception reinforcement device illustrated in FIG. 3.

FIG. 4 illustrates an internal circuit of the first power-supply switching unit 312 or the second power-supply switching unit 322 included in the transmission/reception reinforcement device illustrated in FIG. 3.

Referring to FIGS. 1 through 4, the first power-supply switching unit 312 or the second power-supply switching unit 322 includes an external power-supply input terminal $V_{EXT}$, an internal power-supply input terminal HPD, a power-supply output terminal $V_{CC}$, and a p-channel field effect transistor $TR_P$ as a switch.

The external power-supply input terminal $V_{EXT}$, to which a separate external power-supply voltage is input, is connected to an anode of a first diode $SPRD_L$ and a gate of the p-channel field effect transistor $TR_P$. A cathode of the first diode $SPRD_L$ is connected to the power-supply output terminal $V_{CC}$. The internal power-supply input terminal HPD is connected to a communication line $T_{H13}$-$T_{D13}$ to which an HPD signal voltage received from the display device 12 or 22 is applied. The internal power-supply input terminal HPD is also connected to a source of the p-channel field effect transistor $TR_P$. A drain of the p-channel field effect transistor $TR_P$ is connected to an anode of a second diode $SPRD_U$. A cathode of the second diode $SPRD_U$ is connected to the power-supply output terminal $V_{CC}$.

The p-channel field effect transistor $TR_P$ enters an ON state when an external power-supply voltage from the external power-supply input terminal $V_{EXT}$ becomes lower than a predetermined voltage. When the p-channel field effect transistor $TR_P$ is in an OFF state, the external power-supply voltage is applied to the power-supply output terminal $V_{CC}$. When the p-channel field effect transistor $TR_P$ is in the ON state, an internal power-supply voltage from the internal power-supply input terminal HPD is applied to the power-supply output terminal $V_{CC}$.

In other words, when the external power-supply voltage is applied, the transmission/reception reinforcement device illustrated in FIG. 3 operates by means of the external power-supply voltage. When the external power-supply voltage becomes lower than the predetermined voltage or is not applied, the transmission/reception reinforcement device operates by means of the HPD signal voltage applied to one of the communication lines between the host device 11 or 21 and the display device 12 or 22.

Thus, smooth transmission of digital image data can be maintained in spite of dropping or interruption of an external power supply of the transmission/reception reinforcement device illustrated in FIG. 3.

MODE OF THE INVENTION

Figure 5:
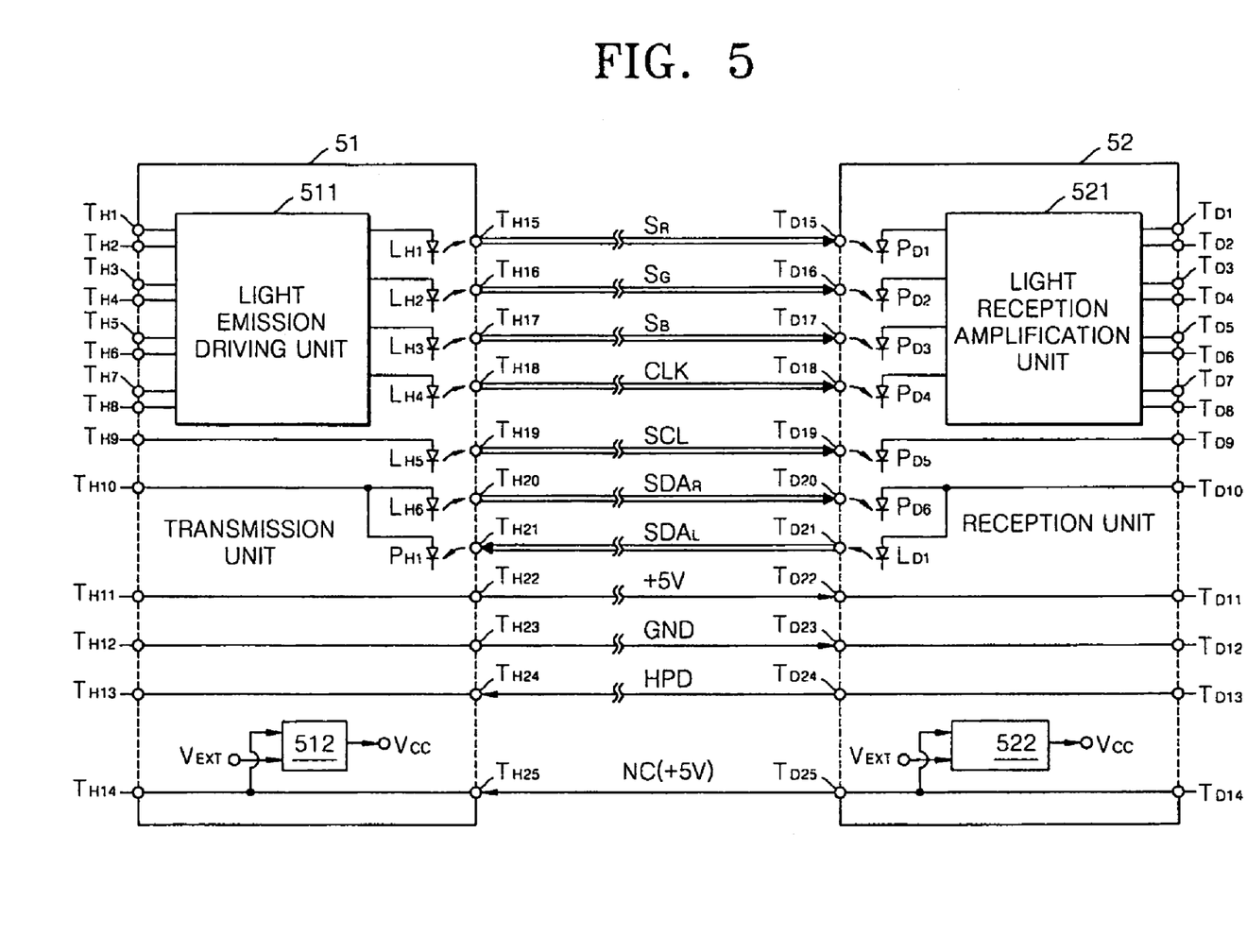
FIG. 5 illustrates an optical cable module as a transmission/reception reinforcement device interposed between a host device illustrated in FIG. 1 or 2 and a display device illustrated in FIG. 1 or 2 according to a second embodiment of the present invention.

FIG. 5 illustrates an optical cable module as a transmission/reception reinforcement device interposed between the host device 11 or 21 illustrated in FIG. 1 or 2 and the display device 21 or 22 illustrated in FIG. 1 or 2 according to a second embodiment of the present invention. In FIG. 5, internal circuits of a first power-supply switching unit 512 and a second power-supply switching unit 522 are the same as those illustrated in FIG. 4.

In FIGS. 3 and 5, like reference numerals refer to like elements. A difference between the first embodiment illustrated in FIG. 3 and the second embodiment illustrated in FIG. 5 is an internal power-supply line $T_{H25}$-$T_{D25}$ connected with an internal power-supply input terminal NC. In other words, the internal power-supply line $T_{H25}$-$T_{D25}$ connected with the internal power-supply input terminal NC is a reserved line between a reserved terminal $T_{H14}$ illustrated in FIG. 1 or 2 at the side of the host device 11 or 21 and a reserved terminal $T_{D14}$ illustrated in FIG. 1 or 2 at the side of the display device 12 or 22. An internal power-supply voltage of +5V is applied to the reserved line NC through the reserved terminal $T_{D14}$ at the side of the display device 12 or 22.

Figure 6:
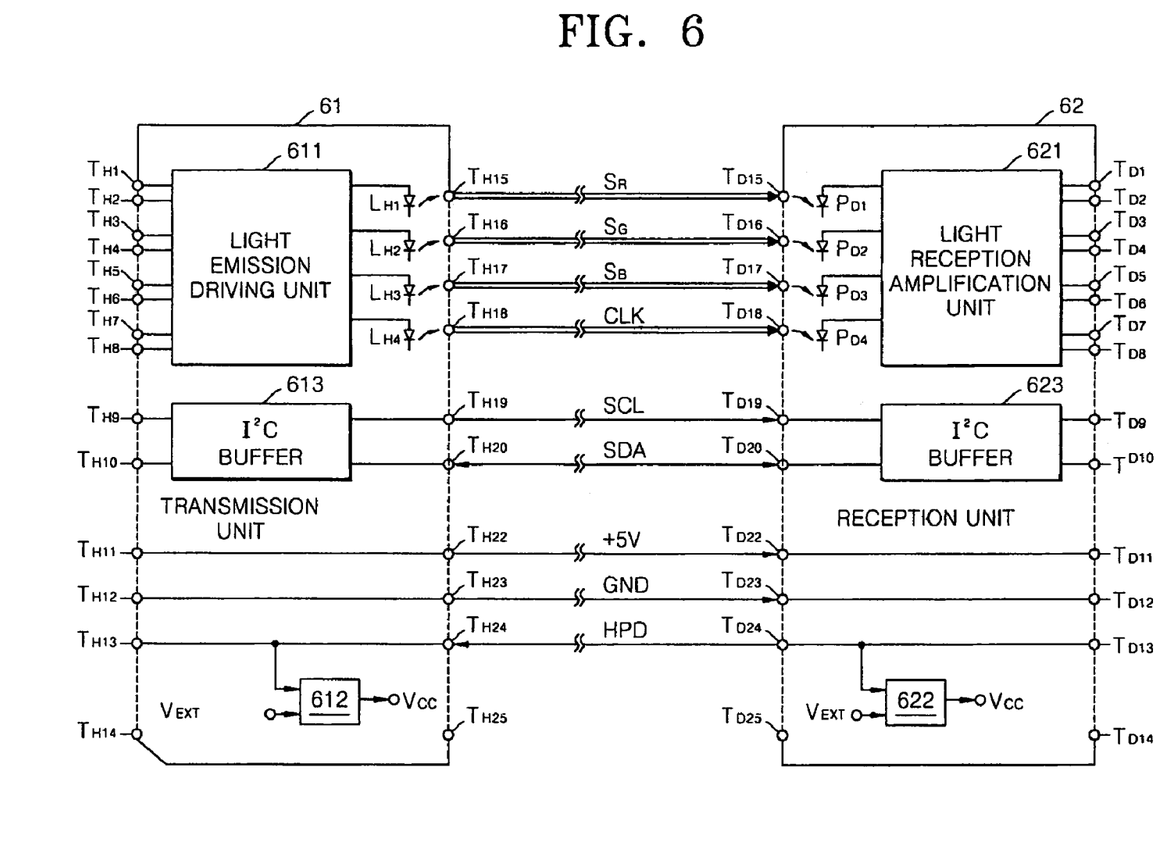
FIG. 6 illustrates an optical cable module as a transmission/reception reinforcement device interposed between a host device illustrated in FIG. 1 or 2 and a display device illustrated in FIG. 1 or 2 according to a third embodiment of the present invention.

FIG. 6 illustrates an optical cable module as a transmission/reception reinforcement device interposed between the host device 11 or 21 illustrated in FIG. 1 or 2 and the display device 12 or 22 illustrated in FIG. 1 or 2 according to a third embodiment of the present invention. In FIGS. 3 and 6, like reference numerals refer to like elements. In FIG. 6, internal circuits of a first power-supply switching unit 612 and a second power-supply switching unit 622 are the same as those illustrated in FIG. 4. Hereinafter, only a difference between the first embodiment illustrated in FIG. 3 and the third embodiment illustrated in FIG. 6 will be described in detail.

The transmission/reception reinforcement device of the digital image system according to the third embodiment of the present invention is an optical cable module including optical cables $T_{H15}$-$T_{D15}$ through $T_{H18}$-TD18, a transmission unit 61, and a reception unit 62.

The transmission unit 61 operates when supplied with a power-supply voltage $V_{CC}$ from the first power-supply switching unit 612, converts digital image data $S_{R+}$ through CLK– of 8 channels, which have been received from the host device 11 or 21, into optical signals $S_R$ through CLK by means of a light emission driving unit 611 for output to the optical cables $T_{H15}$-$T_{D15}$ through $T_{H18}$-$T_{D18}$, and buffers an I²C communication clock signal SCL and I²C communication data SDA, which have been received from the host device 11 or 21, by means of an I²C buffer 613 for output to electric cables $T_{H19}$-$T_{D19}$ through $T_{H20}$-$T_{D20}$, and buffers the I²C communication data SDA received from the electric cable $T_{H20}$-$T_{D20}$ by means of the I²C buffer 613 for output to the host device 11 or 21.

The reception unit 62 operates when supplied with the power-supply voltage $V_{CC}$ from the second power-supply switching unit 622, converts the optical signals $S_R$ through CLK of 4 channels received from the optical cables $T_{H15}$-$T_{D15}$ through $T_{H18}$-$T_{D18}$ into the digital image data $S_{R+}$ through CLK– by means of a light reception amplification unit 621 for output to the display device 12 or 22, buffers the I²C communication clock signal SCL and the I²C communication data SDA by means of the I²C buffer 613 for output to the display device 12 or 22, and buffers the I²C communication data SDA received from the display device 12 or 22 by means of the I²C buffer 613 for output to the optical cable $T_{H20}$-$T_{D20}$.

Figure 7:
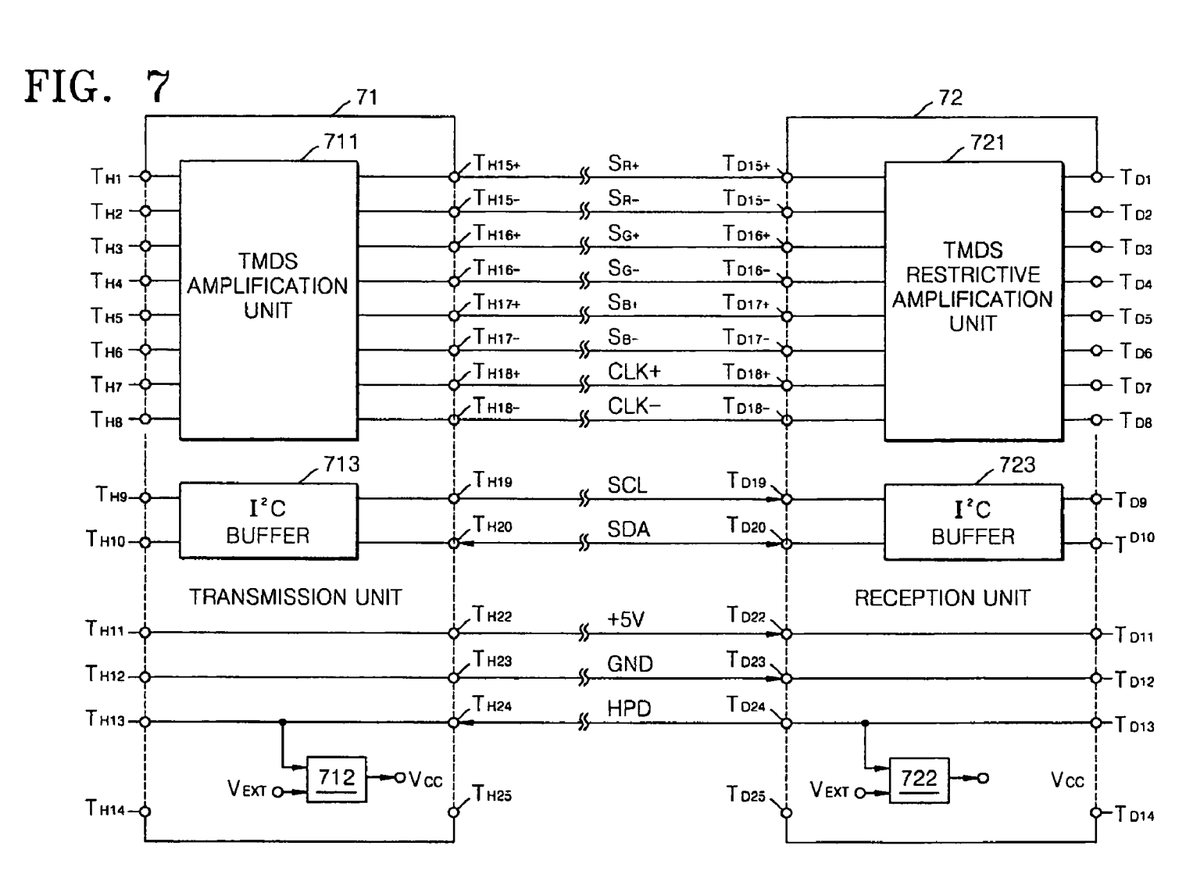
FIG. 7 illustrates an optical cable module as a transmission/reception reinforcement device interposed between a host device illustrated in FIG. 1 or 2 and a display device illustrated in FIG. 1 or 2 according to a fourth embodiment of the present invention.

FIG. 7 illustrates an optical cable module as a transmission/reception reinforcement device interposed between the host device 11 or 21 illustrated in FIG. 1 or 2 and the display device 12 or 22 illustrated in FIG. 1 or 2 according to a fourth embodiment of the present invention. In FIGS. 3 and 7, like reference numerals refer to like elements. In FIG. 7, internal circuits of a first power-supply switching unit 712 and a second power-supply switching unit 722 are the same as those illustrated in FIG. 4. Hereinafter, only a difference between the first embodiment illustrated in FIG. 3 and the fourth embodiment illustrated in FIG. 7 will be described in detail.

A repeater as the transmission/reception reinforcement device of the digital image system according to the fourth embodiment of the present invention includes a transmission unit 71 and a reception unit 72.

The transmission unit 71 operates when supplied with a power-supply voltage $V_{CC}$ from the first power-supply switching unit 712, amplifies digital image data $S_{R+}$ through CLK– of 8 channels, which have been received from the host device 11 or 21, into optical signals $S_R$ through CLK by means of a transition minimized differential signaling (TMDS) amplification unit 711 for output to optical cables $T_{H15}$-$T_{D15}$ through $T_{H18}$-$T_{D18}$, and buffers an I²C communication clock signal SCL and I²C communication data SDA, which have been received from the host device 11 or 21, by means of an I²C buffer 713 for output to electric cables $T_{H19}$-$T_{D19}$ through $T_{H20}$-$T_{D20}$, and buffers the I²C communication data SDA received from the electric cable $T_{H20}$-$T_{D20}$ by means of the I²C buffer 713 for output to the host device 11 or 21.

The reception unit 72 operates when supplied with the power-supply voltage $V_{CC}$ from the second power-supply switching unit 722, restrictively amplifies the digital image data $S_{R+}$ through CLK− received from the optical cables $T_{H15}$-$T_{D15}$ through $T_{H18}$-$T_{D18}$ by means of a TMDS restrictive amplification unit 721 for output to the display device 12 or 22, buffers the I²C communication clock signal SCL and the I²C communication data SDA received from electric cables $T_{H19}$-$T_{D19}$ and $T_{H20}$-$T_{D20}$ by means of an I²C buffer 723 for output to the display device 12 or 22, and buffers the I²C communication data SDA received from the display device 12 or 22 by means of the I²C buffer 623 for output to the electric cable $T_{H20}$-$T_{D20}$.

Figure 8:
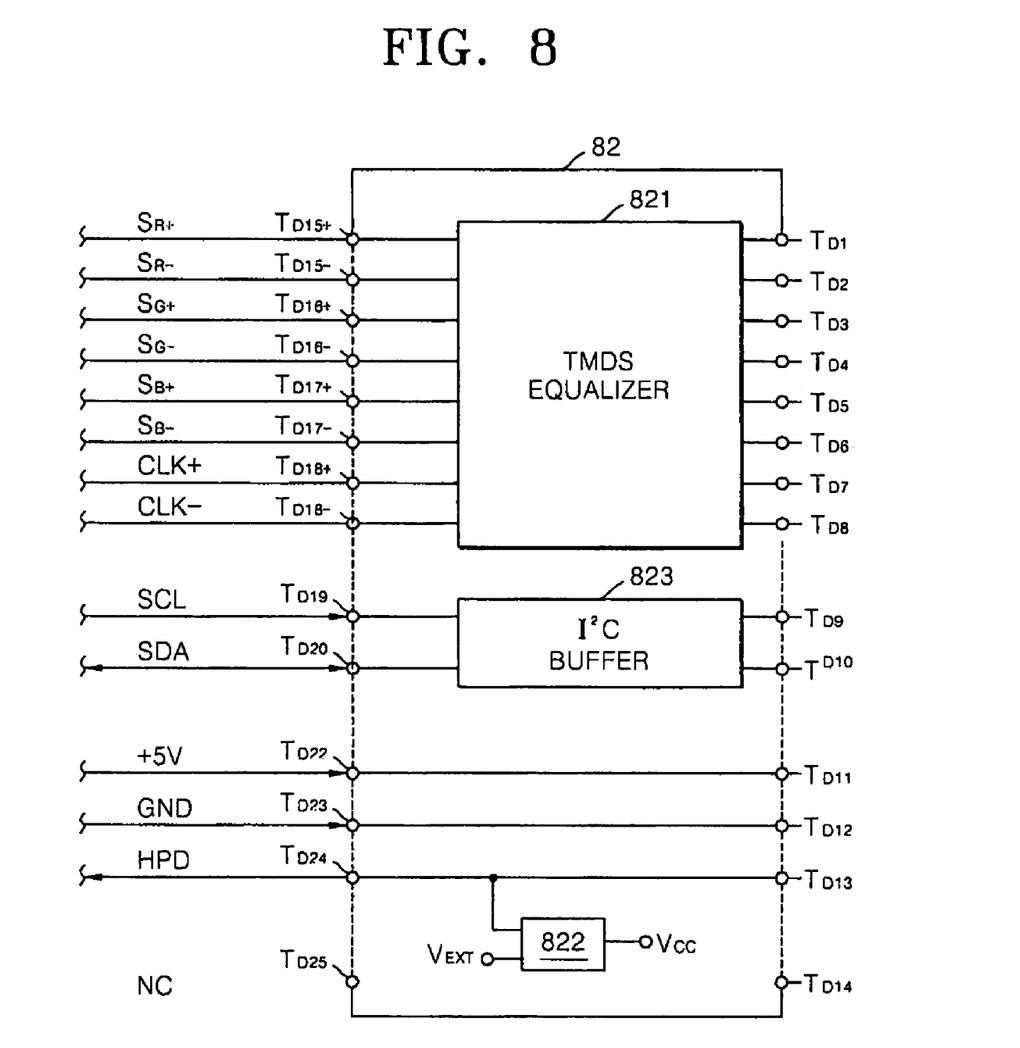
FIG. 8 illustrates an optical cable module as a transmission/reception reinforcement device interposed between a host device illustrated in FIG. 1 or 2 and a display device illustrated in FIG. 1 or 2 according to a fifth embodiment of the present invention.

FIG. 8 illustrates an equalizer apparatus 82 as a transmission/reception reinforcement device interposed between the host device 11 or 21 illustrated in FIG. 1 or 2 and the display device 12 or 22 illustrated in FIG. 1 or 2 according to a fifth embodiment of the present invention. In FIGS. 3 and 8, like reference numerals refer to like elements. In FIG. 8, internal circuits of a first power-supply switching unit 812 and a second power-supply switching unit 822 are the same as those illustrated in FIG. 4. Hereinafter, only a difference between the first embodiment illustrated in FIG. 3 and the fifth embodiment illustrated in FIG. 8 will be described in detail.

An equalizer apparatus 82 as the transmission/reception reinforcement device of the digital image system according to the fifth embodiment of the present invention operates when supplied with the power-supply voltage $V_{CC}$ from the second power-supply switching unit 823, restores attenuated signals of digital image data $S_{R+}$ through CLK− received from electric cables by means of a TMDS equalizer 821 for output to the display device 12 or 22, buffers an I²C communication clock signal SCL and I²C communication data SDA received from electric cables by means of an I²C buffer 823 for output to the display device 12 or 22, and buffers the I²C communication data SDA received from the display device 12 or 22 by means of the I²C buffer 823 for output to the electric cables.

The invention claimed is:

1. A digital image system comprising a host device, a transmission/reception reinforcement device a display device which the host device transmits digital image data to the display device through the transmission/reception reinforcement device, wherein the transmission/reception reinforcement device comprises a first power-supply switching unit or a second power-supply switching unit, and each of the first power-supply switching unit and the second power-supply switching unit comprises:

an external power-supply input terminal to which a separate external power-supply voltage is input;

an internal power-supply input terminal connected with one internal power-supply line out of communication lines between the host device and the display device;

a power-supply output terminal from which the external power-supply voltage from the external power-supply input terminal or an internal power-supply voltage from the internal power-supply input terminal is output; and a switch which enters an ON state when he external power-supply voltage from the external power-supply input terminal becomes lower than a predetermined voltage, and the external power-supply voltage is applied to the power-supply output terminal when the switch is in an OFF state and the internal power-supply voltage from the internal power-supply input terminal is applied to the power-supply output terminal when the switch is in the ON state, wherein in each of the first power-supply switching unit and the second power-supply switching unit, the switch is a p-channel field effect transistor, the external power-supply input terminal is connected to an anode of a first diode and a gate of the p-channel field effect transistor, a cathode of the first diode is connected to the power-supply output terminal, the internal power-supply input terminal is connected to a source of the p-channel field effect transistor, a drain of the p-channel field effect transistor is connected to an anode of a second diode, and a cathode of the second diode is connected to the power-supply output terminal.

2. A digital image system comprising a host device, a transmission/reception reinforcement device, and a display device, in which the host device transmits digital image data to the display device through the transmission/reception reinforcement device, wherein the transmission/reception reinforcement device comprises a first power-supply switching unit or a second power-supply switching unit, and each of the first power-supply switching unit and the second power-supply switching unit comprises:

an external power-supply input terminal to which a separate external power-supply voltage is input;

an internal power-supply input terminal connected with one internal power-supply line out of communication lines between the host device and the display device;

a power-supply output terminal from which the external power-supply voltage from the external power-supply input terminal or an internal power-supply voltage from the internal power-supply input terminal is output; and a switch which enters an ON state when the external power-supply voltage from the external power-supply input terminal becomes lower than a predetermined voltage, and the external power-supply voltage is applied to the power-supply output terminal when the switch is in an OFF state and the internal power-supply voltage from the internal power-supply input terminal is applied to the power-supply output terminal when the switch is in the ON state, wherein extended display identification data (EDID) of the display device is transmitted to the host device through the transmission/reception reinforcement device according to an inter-integrated circuit (I²C) communication protocol, and the host device transmits the digital image data to the display device according to the EDID.

3. The digital image system of claim 2, wherein the host device comprises:

a high definition multimedia interface (HDMI) transmission unit converting audio data, a clock signal, and the digital image data into transition minimized differential signaling (TMDS) signals in an HDMI format for output to the transmission/reception reinforcement device; and a graphic control unit controlling an operation of the HDMI transmission unit according to the EDID, and the display device comprises:

a memory storing the EDID and providing the EDID to the graphic control unit of the host device according to the I²C communication protocol; and an HDMI reception unit restoring the audio data, the clock signal, and the digital image data from the TMDS signals, which are received from the transmission/reception reinforcement device, to the HDMI format.

4. The digital image system of claim 2, wherein the host device comprises:

a transition minimized differential signaling (TMDS) transmission unit converting a clock signal and the digital image data into TMDS signals in a digital visual interface (DVI) format for output to the transmission/reception reinforcement device; and a graphic control unit controlling an operation of the TMDS transmission unit according to the EDID, and the display device comprises:

a memory storing the EDID and providing the EDID to the graphic control unit of the host device according to the I²C communication protocol; and an HDMI reception unit restoring the clock signal and the digital image data from the TMDS signals, which are received from the transmission/reception reinforcement device, to the DVI format.

5. The digital image system of claim 2, wherein the internal power-supply line connected with the internal power-supply input terminal is a line to which a hot plug detect (HPD) signal voltage from the display device is applied.

6. The digital image system of claim 2, wherein the internal power-supply line connected with the internal power-supply input terminal is a reserved line connected between a reserved terminal at a side of the host device and a reserved terminal at a side of the display device, and the internal power-supply voltage is applied to the reserved line through the reserved terminal at the side of the display device.

7. The digital image system of claim 2, wherein the transmission/reception reinforcement device is an optical cable module comprising:

an optical cable;

a transmission unit operating when supplied with a power-supply voltage from the first power-supply switching unit, converting the digital image data, an I²O communication clock signal, and I²C communication data, which have been received from the host device, into optical signals for output to the optical cable, and converting the I²C communication data received from the optical cable into an electric signal for output to the host device; and a reception unit operating when supplied with a power-supply voltage from the second power-supply switching unit, converting the optical signals received from the optical cable for output to the display device, and converting the I²C communication data received from the display device into an optical signal for output to the optical cable.

8. The digital image system of claim 2, wherein the transmission/reception reinforcement device is an optical cable module comprising:

a transmission unit operating when supplied with a power-supply voltage from the first power-supply switching unit, converting the digital image data received from the host device into optical signals for output to the optical cable, buffering an I²C communication clock signal and I²C communication data received from the host device for output to an electric cable, and buffering the I²C communication data received from the electric cable for output to the host device; and a reception unit operating by being supplied with a power-supply voltage from the second power-supply switching unit, converting the optical signals received from the optical cable into the digital image data for output to the display device, and buffering the I²C communication data received from the display device for output to the electric cable.

9. The digital image system of claim 2, wherein the transmission/reception reinforcement device is a repeater comprising:

the transmission unit operating when supplied with a power-supply voltage from the first power-supply switching unit, amplifying the digital image data received from the host device for output to an electric cable, buffering an I²C communication clock signal and I²C communication data received from the host device for output to the electric cable, and buffering the I²C communication data received from the electric cable for output to the host device; and a reception unit operating when supplied with a power-supply voltage from the second power-supply switching unit, amplifying the digital image data received from the electric able for output to the display device, and buffering the I²C communication clock signal and the I²C communication data received from the display device for output to the electric cable.

10. The digital image system of claim 2, wherein the transmission/reception reinforcement device is an equalizer apparatus when supplied with a power-supply voltage from the second power-supply switching unit, restoring attenuated signals of the digital image data received from an electric cable for output to the display device, buffering I²C communication clock signal and I²C communication data received from the electric cable for output to the display device, and buffering the I²C communication data received from the display device for output to the electric cable.

* * * * *